US008028855B2

(12) United States Patent
White et al.

(10) Patent No.: US 8,028,855 B2
(45) Date of Patent: Oct. 4, 2011

(54) BOTTLE DISPLAY AND DISPENSER DEVICE AND METHOD

(75) Inventors: Joel S. White, New York, NY (US); Bernard Primiano, Norcross, GA (US)

(73) Assignees: Display Industries, LLC, Norcross, GA (US); PepsiCo, Inc., Purchase, NY (US)

( * ) Notice: Subject to any disclaimer, the term of this patent is extended or adjusted under 35 U.S.C. 154(b) by 0 days.

(21) Appl. No.: 12/862,211

(22) Filed: Aug. 24, 2010

(65) Prior Publication Data

US 2010/0320222 A1 Dec. 23, 2010

Related U.S. Application Data

(63) Continuation of application No. 11/746,893, filed on May 10, 2007, and a continuation of application No. 11/523,173, filed on Sep. 18, 2006, now abandoned.

(51) Int. Cl.
*A47F 1/08* (2006.01)
*B65D 83/00* (2006.01)
*B65G 1/06* (2006.01)

(52) U.S. Cl. ...... 221/191; 221/194; 221/255; 221/312 R

(58) Field of Classification Search .................. 221/289, 221/291, 295, 193–195, 191, 151, 281, 262, 221/265, 261, 263, 255–256, 251, 292, 123, 221/130, 133, 312 R
See application file for complete search history.

(56) References Cited

U.S. PATENT DOCUMENTS

| | | | | |
|---|---|---|---|---|
| 3,318,455 | A * | 5/1967 | Takahashi | 211/59.2 |
| 3,795,345 | A | 3/1974 | Baxendale | |
| 4,998,628 | A * | 3/1991 | Ross | 211/59.2 |
| 5,080,256 | A | 1/1992 | Rockola | |
| 5,247,798 | A | 9/1993 | Collard, Jr. | |
| 5,396,997 | A * | 3/1995 | Johnson | 211/59.2 |
| 6,152,323 | A | 11/2000 | Immel | |
| 6,173,582 | B1 | 1/2001 | Hixson | |
| 6,206,237 | B1 * | 3/2001 | Dillon et al. | 221/289 |
| 6,234,345 | B1 * | 5/2001 | Minh et al. | 221/124 |
| 6,786,341 | B2 * | 9/2004 | Stinnett et al. | 211/59.2 |
| 6,862,896 | B1 | 3/2005 | Seidl | |
| 6,991,116 | B2 * | 1/2006 | Johnson et al. | 211/59.2 |
| 7,513,390 | B2 | 4/2009 | Artsiely | |
| 7,757,890 | B2 * | 7/2010 | Alford et al. | 221/2 |
| 7,918,365 | B2 * | 4/2011 | White et al. | 221/191 |
| 2003/0019880 | A1 | 1/2003 | Timmers et al. | |
| 2006/0131320 | A1 | 6/2006 | Nagelski et al. | |
| 2006/0131321 | A1 | 6/2006 | Nagelski et al. | |
| 2007/0289990 | A1 | 12/2007 | Artsiely | |
| 2008/0067188 | A1 * | 3/2008 | White et al. | 221/123 |

* cited by examiner

*Primary Examiner* — Michael K Collins
(74) *Attorney, Agent, or Firm* — Banner & Witcoff, Ltd.

(57) ABSTRACT

A dispenser for storing and dispensing containers having one or more passageways that provides a pathway for the containers. The dispenser includes an outlet for dispensing the containers and an inlet or opening for loading containers into the dispenser. The dispenser may include a plurality of shelves stackable on top of each other. The dispenser may include a housing and a moveable door. The dispenser may further include a stopper mechanism for blocking the movement of the containers within the passageway.

5 Claims, 7 Drawing Sheets

BOTTLE DISPLAY AND DISPENSER DEVICE AND METHOD

CROSS REFERENCE TO RELATED APPLICATIONS

This application is a continuation of and claims priority to U.S. application Ser. No. 11/523,173 filed Sep. 18, 2006, now abandoned. This application is also a continuation of and claims priority to U.S. application Ser. No. 11/746,893 filed May 10, 2007, and published as U.S. Patent Publication No. 2008/0067188.

FIELD OF THE INVENTION

The invention relates generally to a dispenser for storing and sequentially dispensing containers.

BACKGROUND OF THE INVENTION

In a typical grocery or convenience store, beverages such as those sold in 2 liter plastic bottles are displayed on shelving located along the aisles of the store. Typically, brands of the same type of beverages are displayed on shelving in the same section of the store. Usually, the 2 liter bottles of a particular brand are stocked in a vertical upright position on a shelf in a plurality of rows of bottles that extend from the front to the back of the shelf.

In the shelving arrangement of a typical store there often is an unutilized area since the uppermost shelf generally is not stocked with bottles. This is because the higher level is usually inconvenient for stocking by a stockperson, as well as being inconvenient for a customer to remove bottles. This is especially true for any bottles which may be stocked in rows rearward of the aisle edge of such top shelf.

Therefore, a need exists for a container dispenser for placement on a top, or other shelf, that is convenient for stocking containers and is convenient for dispensing a container stocked in the dispenser to a customer.

BRIEF SUMMARY OF THE INVENTION

This invention addresses the foregoing needs in the art by providing a container dispenser that allows for convenient stocking and dispensing of containers.

In one aspect of the invention, a dispenser for storing and dispensing containers has a housing that includes a first opening for loading containers and a second opening for dispensing containers. The dispenser also has a passageway disposed within the housing providing a pathway for the containers to travel from the first opening to the second opening. The passageway includes at least one inclined ramp. A loading mechanism is positioned adjacent the first opening in an aligned relationship with the passageway. The loading mechanism has at least one contact surface for receiving a container to be loaded into the dispenser and for aligning the container in a predetermined aligned relationship with the passageway. The contact surface urges the container towards the passageway by movement of the mechanism, while substantially maintaining the container in the predetermined aligned relationship.

In another aspect of the invention, a dispenser for storing and sequentially dispensing a plurality of containers comprises a housing having an inlet opening through which said containers are loaded into the housing and an outlet where the containers are dispensed from the dispenser. A passageway is disposed in the housing connecting the inlet with the outlet.

The passageway has a first inclined ramp having a first end and a second end. The first end is adjacent the inlet and the second end is positioned lower than the first end of the first ramp to provide a pathway for a container to roll from the first end of the first ramp to the second end of the first ramp. A second inclined ramp is disposed in the housing with the second ramp having a first end and a second end. The first end is positioned adjacent the outlet, and the second end of the second inclined ramp is higher than the first end of the second ramp. This allows a container to roll from the second end of the second ramp towards the first end of the second ramp, and hence the outlet. The dispenser includes an opening in the first ramp adjacent the second end of the first ramp and a channel wall within the housing. The passageway also includes a channel with the channel wall at least partially defining the channel. The channel has a first end adjacent the second end of said second ramp. The channel extends upward from the second ramp and extends at least to adjacent the second end of the first ramp providing a pathway between the second end of the first ramp and the second end of the second ramp. A shock absorption ramp has one end attached to the channel wall. A free, end of the shock absorption ramp extends into the channel to engage containers falling through the channel to absorb energy of the containers. The second end of the second ramp rests on an energy absorption member to also absorb energy from the container as the container falls onto the second end of the second ramp.

In another aspect of the invention, a dispenser for storing and sequentially dispensing a plurality of containers comprises a body which has a front, a rear, a top, a bottom, and a first and a second side wall. The body also has an inlet opening through which the containers are loaded into the body, and an outlet opening in the front of said body through which said containers are dispensed from the body. A passageway disposed in the body connects the inlet with the outlet. The passageway includes at least a first inclined ramp disposed in the body with the ramp having a first end and a second end. The first end is positioned adjacent the outlet and the second end of the inclined ramp is higher than the first end of the ramp to allow a container to roll from the second end of the ramp towards the first end of the ramp. A container stopper mechanism is provided to stop a container. The mechanism is positioned in the vicinity of the outlet with the stopper mechanism including a member having a first end and a second cantilever end. The first end is mounted to the body, and the second cantilever end depends downward towards the inclined ramp with the second cantilever end of the member normally positioned in a first stopping position to contact a container on the ramp adjacent the outlet in a predetermined stopping position on the ramp. This prevents the container from moving towards the outlet. The member is moveable to a second releasing position for releasing the stopped container to allow the container to move towards the outlet in response to a releasing signal applied to the member. The member is positioned within the body so that the first end of the member is mounted rearward from the front end of a container that is stopped by engagement of the member.

In another aspect of the invention a method is provided for stocking containers in a container dispenser having an inlet opening for stocking containers, and an outlet opening for dispensing containers, and at least one inclined ramp providing a passageway that containers roll along between said inlet and outlet openings. The method includes providing a loading mechanism positioned adjacent the inlet opening in an aligned relationship with the passageway. The loading mechanism has at least one contact surface for receiving a container to be loaded into the dispenser and for aligning the container in a predetermined aligned relationship with the passageway. The contact surface urges the container towards the passageway by movement of the loading mechanism from a loading position to an unloading position while substantially maintaining the container in the predetermined aligned relationship. The loading mechanism is moved to the loading position and the container is positioned on the at least one contact surface of the loading mechanism. The loading mechanism is moved to the unloading position to cause the container to be urged off the loading mechanism and to roll onto the inclined ramp while maintaining the predetermined alignment of the container with the passageway.

DETAILED DESCRIPTION OF THE INVENTION

Figure 1:
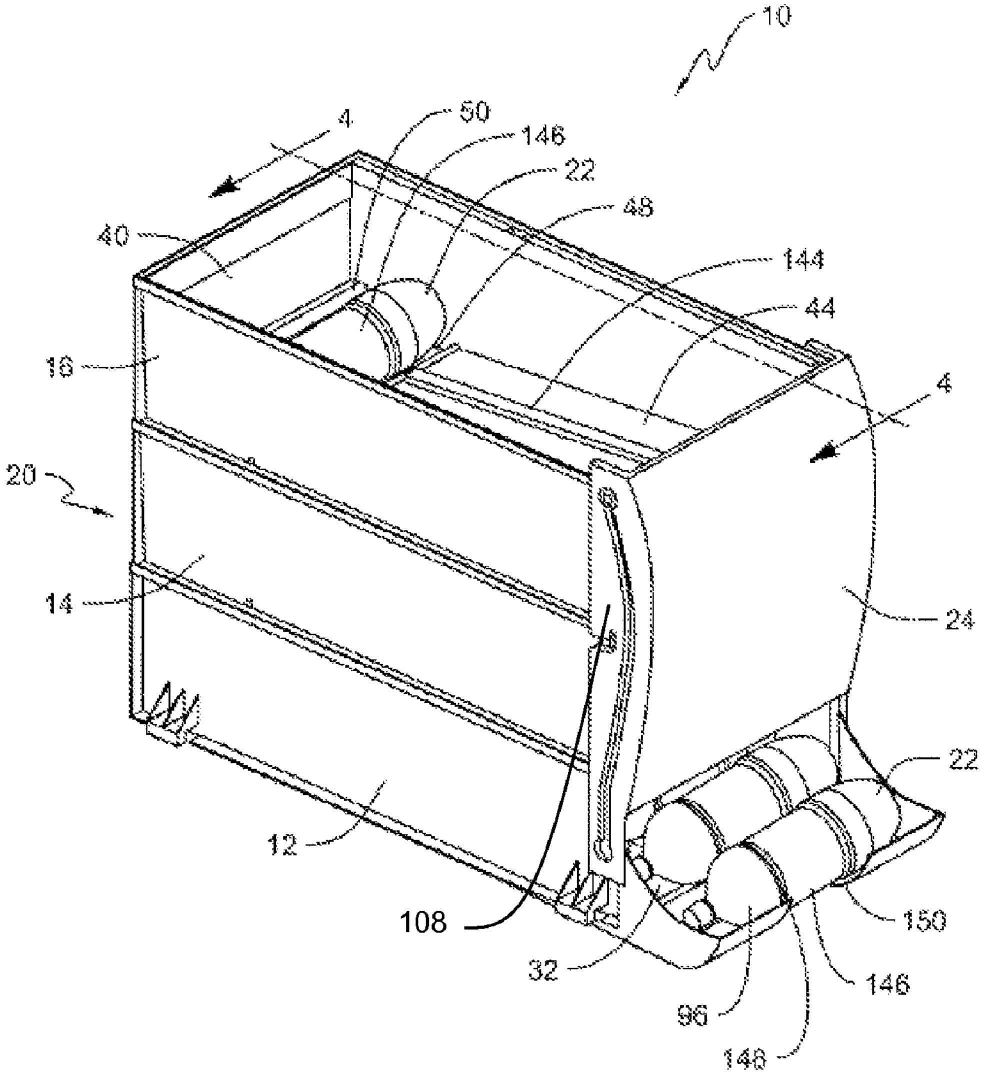
FIG. 1 is a perspective view of a dispenser in accordance with the present invention.
Figure 2:
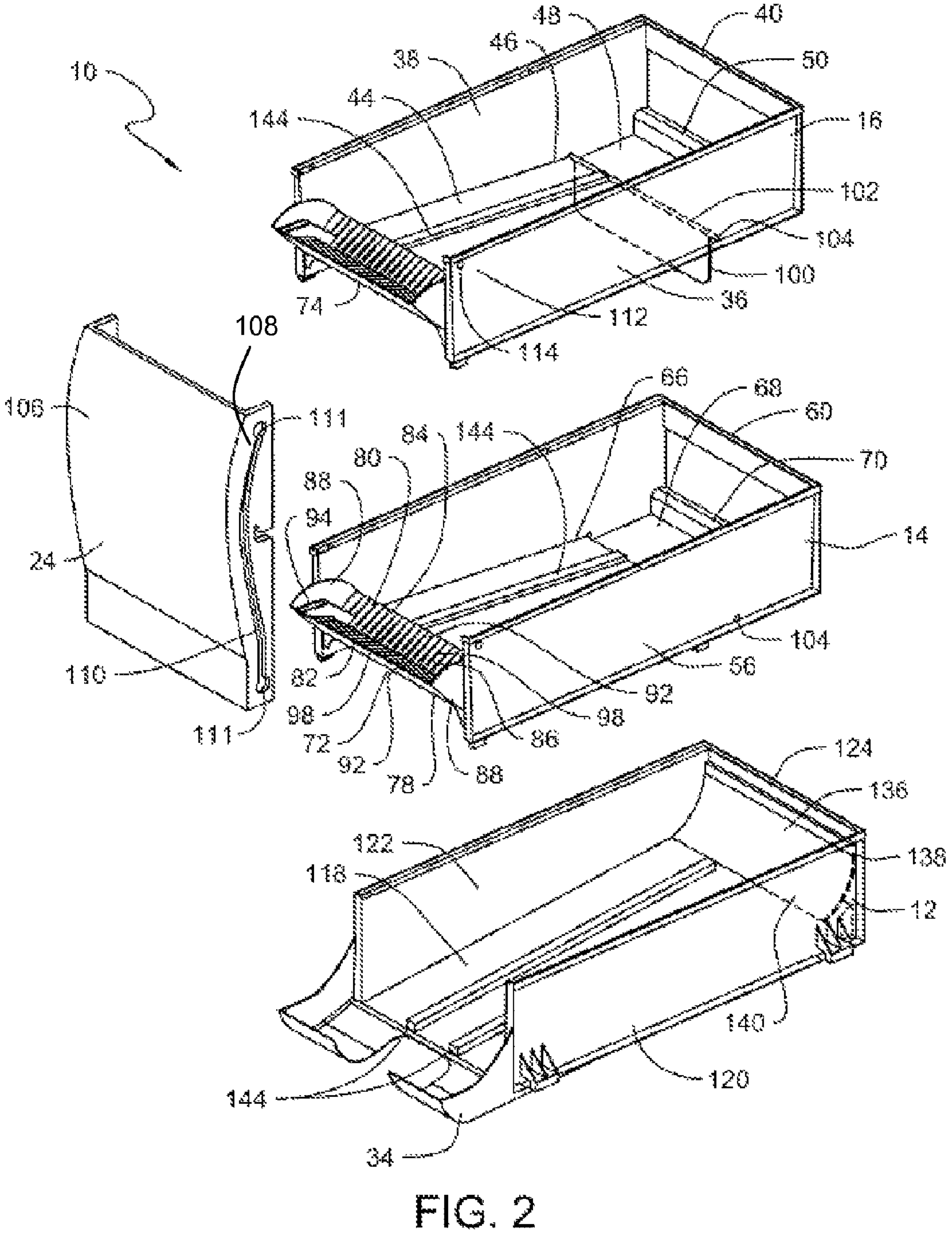
FIG. 2 is a perspective view showing the separate shelves of the dispenser.
Figure 3:
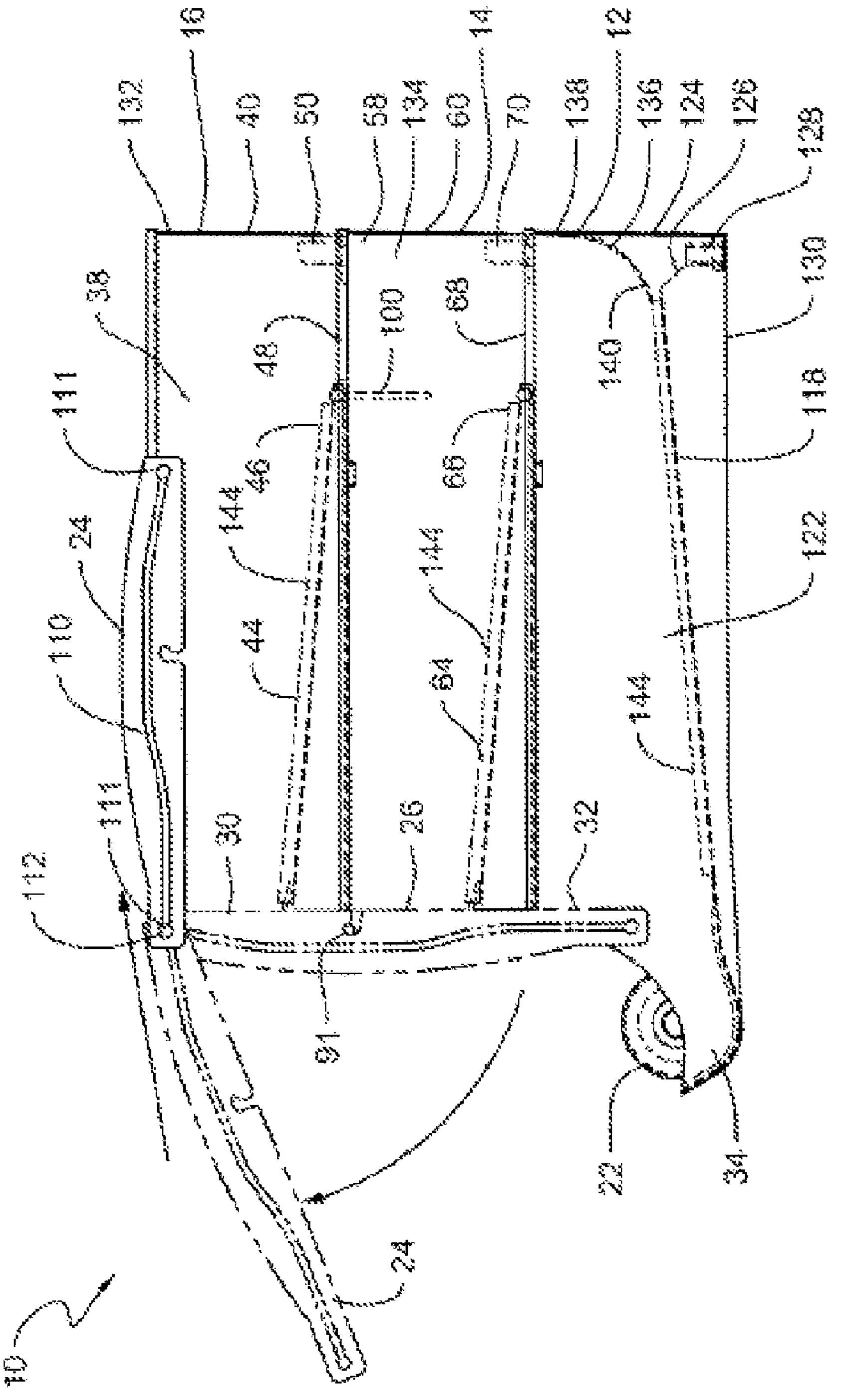
FIG. 3 is a side plan view of the dispenser showing in dotted lines the ramps of the dispenser.

Referring to FIGS. 1-3, the dispenser of the present invention is indicated generally at 10. The dispenser may be of a modular construction with a bottom shelf 12, a middle shelf 14 and a top shelf 16. Shelves 12, 14 and 16 may be molded from a plastic material and are stacked and secured one upon another, and together form a housing 20 for storing and dispensing containers, or bottles 22. Dispenser 10 has a door 24. that when opened, exposes middle shelf inlet 26 and top shelf inlet 30. Bottom shelf 12 is provided with a dispensing outlet 32 and a cradle 34 extending outward from outlet 32 for easy removal of container 22 from cradle 34.

Top shelf 16 includes sidewalls 36 and 38, back wall 40 and an inclined ramp 44 extending rearward from inlet 30 to provide a pathway for containers 22 to roll down towards the rear end 46 of ramp 44. At rear end 46 of ramp 44 is an opening 48. On back wall 40 of top shelf 16 an energy and shock absorbing pad, or bumper 50 is mounted. Middle shelf 14, like top shelf 12, also has sidewalls 56 and 58, a back wall 60 and an inclined bottom wall or ramp 64. The rear end 66 of middle ramp 64 includes an opening 68, while adjacent opening 68 there appears a bumper 70 attached to back wall 60. Top shelf 16 and middle shelf 14 have another common feature in that a bottle loading mechanism 72 is mounted at middle shelf inlet 26, while an identical bottle loading mechanism 74 is mounted at top shelf inlet 30.

Loading mechanism 72 has a front plate 78 and a rear plate 80 having inner surfaces 82 and 84 respectively. Inner surfaces 82 and 84 together form a trough 86 for receiving a container 22 to be stocked in dispenser 10. Loading mechanism 72 also has end walls 88 and preferably rods 90 (see FIG. 4) projecting therefrom, for pivotably mounting loading mechanism 72 to dispenser housing or body 20 within bores 91 in housing 20 adjacent inlet 26. Projecting from inner surface 82 of trough 86 are a plurality of optional fins or ribs 92, having top surfaces 98. Ribs 92 may also appear on inner surface 84 of trough 86. The purpose of ribs 92 is to reduce friction with a bottle 22 placed within trough 86, by reducing surface area contact with bottle 22 to allow bottle 22 to more easily roll off trough 86 and onto ramp 64. Inner surface 82 may also have extended length fins 94 appearing on the left side of loading mechanism 72 to provide a raised surface that only allows bottles 22 to be positioned within trough 86 with its neck and shoulder portion 96 on the left side of trough 86. With neck and shoulder portion 96 on the left, stocking is more efficient, and removal of bottles from cradle 34 is generally easier, for right handed people.

To accomplish the same function in a different manner inner surface may optionally have a raised surface (not shown) on the left hand side of inner surface 82 or inner surface 84 that matches at least a portion of the contour of neck and shoulder portion 96 on bottle 22. Such raised portion also allows bottles 22 only to be stocked with shoulder and neck portion 96 on the left side of trough 86. A loading mechanism 74, identical to loading mechanism 72, is positioned adjacent inlet 30 of top shelf 16. Bottles 22 are stocked utilizing loading mechanism 74 in the same manner at top shelf 16, as described for loading bottles 22 at middle shelf 14 utilizing loading mechanism 72.

It can be appreciated from the foregoing description, that in keeping with the modular design of dispenser 10, middle shelf 14 and top shelf 16 are identical and interchangeable. While top shelf 16 and middle shelf 14 may be identical, normally only top shelf is additionally equipped with a flap door 100 that can include a rod 102 for pivotal mounting of flap door 100 within bores 104 in top shelf sidewalls 36, 38. Flap door 100 depends downwardly into the bottle passageway defined along middle ramp 64, for purposes explained later. Another difference between top shelf 16 and middle shelf 14 is that only top shelf 16 has a housing door 24 attached to it, which is utilized to cover both shelves 14 and 16. Housing door 24 has a front face 106 and door sidewalls 108. Advertising and marketing information may be provided on front face 106, if desired. Sidewalls 108 have a channel track 110 formed therethrough. Preferably at both ends of channels 110 are apertures 111 to facilitate the mounting of door 24 to sidewalls 36, 38 of top shelf 16 by means of, for example, hinge pins 112 secured within bores 114. The particular contour of channel track 110 shown in FIG. 3 allows door 24 to be swung outwardly, and then pushed upwardly so as to rest door 24 on top of sidewalls 36 and 38 of top shelf 16. This allows unhindered access to inlets 26 and 30 of middle shelf 14 and top shelf 16, respectively, during loading of the bottles 22 into dispenser 10. After stocking, door 24 may be closed. Of course any suitable door may be utilized with the dispenser 10.

While middle shelf 14 and top shelf 16 have backward slanted ramps 44 and 64 respectively, bottom shelf 12 has a forward slanted inclined ramp 118 that provides a pathway for bottles 22 to roll there along toward dispensing outlet 32 and cradle 34. Bottom shelf 12 also has side walls 120 and 122 and a back wall 124. As best seen in FIG. 3, bottom ramp 118 has a downward depending rear end 126 that rests on a bumper 128. Bumper 128 is preferably positioned on the bottom shelf floor 130 against back wall 124.

Bottom shelf back wall 124, along with back walls 40 and 60, together provide a continuous wall for housing 20 that defines the rear wall 132 of a rear channel passageway 134. Rear channel passageway 134 connects middle shelf 14 and top shelf 16 to bottom shelf 12 to provide a portion of the bottle passageway from inlets 26 and 30 to dispenser outlet 32. Positioned within the lower portion of rear channel 134 is a curved shock absorption ramp 136. Shock absorption ramp

136 is secured at its top end 138 to back wall 124 of bottom shelf 12. Shock absorption ramp 136 also has a free bottom end 140 positioned in a spaced relationship from bottom ramp 118.

Figure 4:
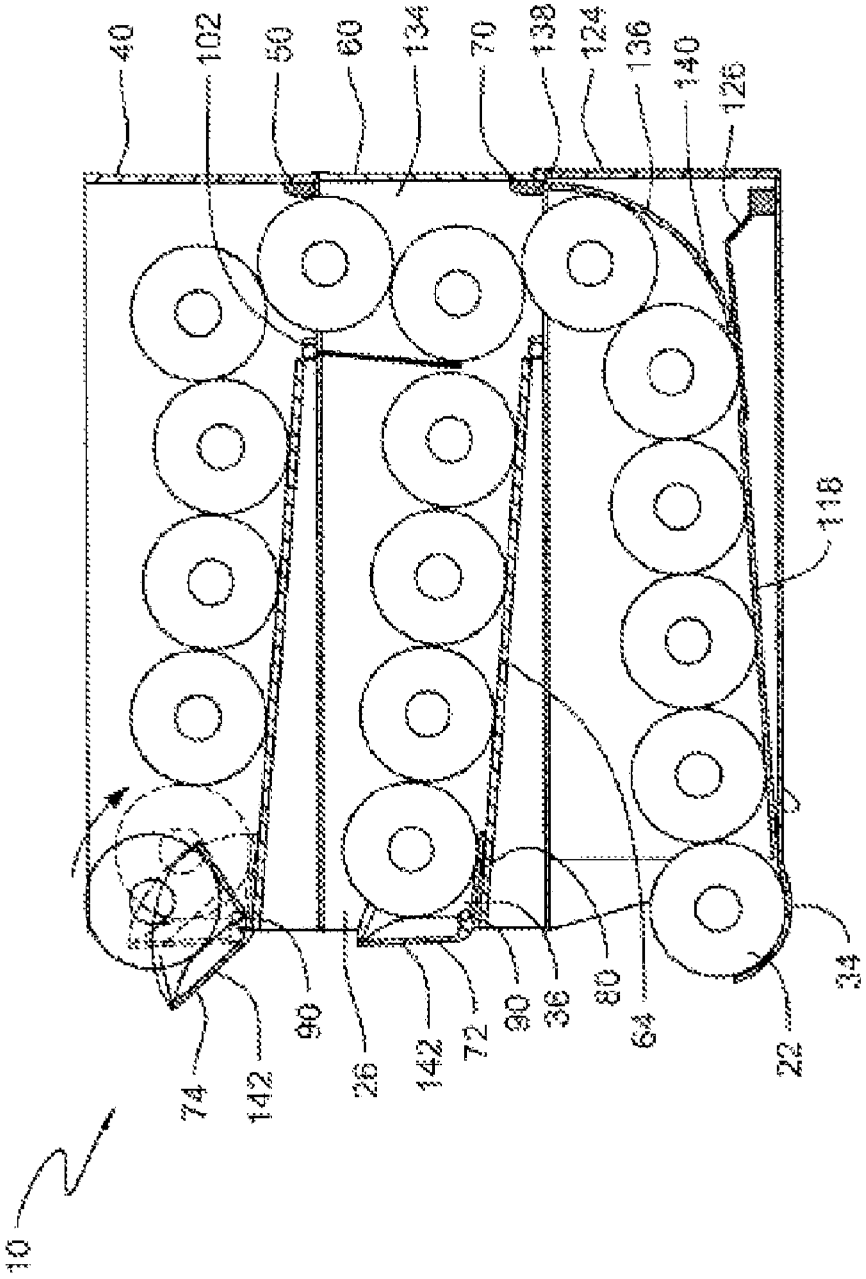
FIG. 4 is a cross sectional side view of the dispenser showing, in dotted lines, the operation of the loading mechanism.
Figure 5A:
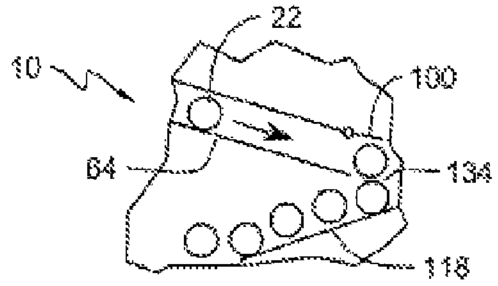
FIGS. 5*a*-5*h* are schematic views of the operation of the flap door of the dispenser.
Figure 5B:
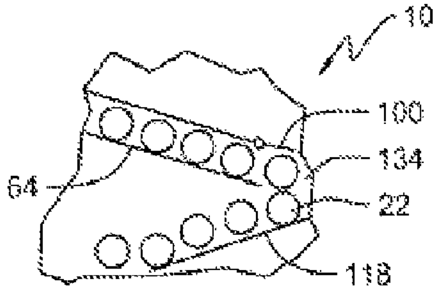
Figure 5C:
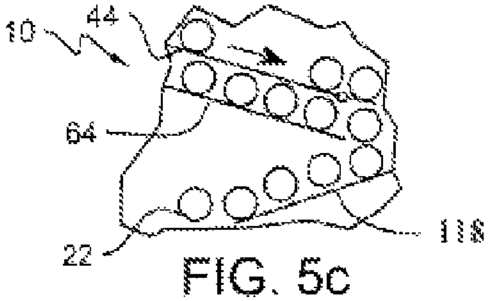
Figure 5D:
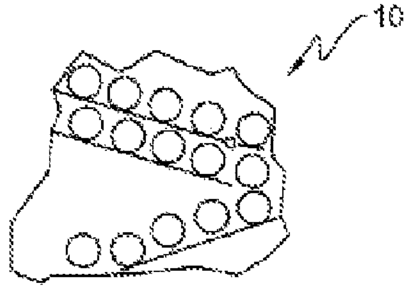
Figure 5E:
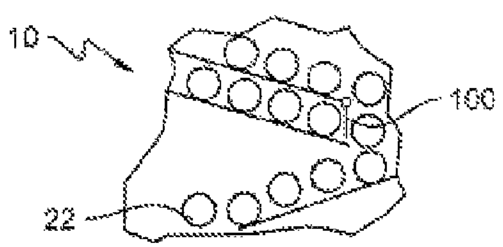
Figure 5F:
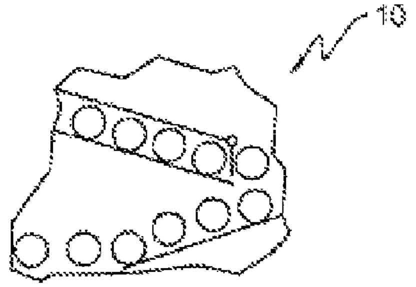
Figure 5G:
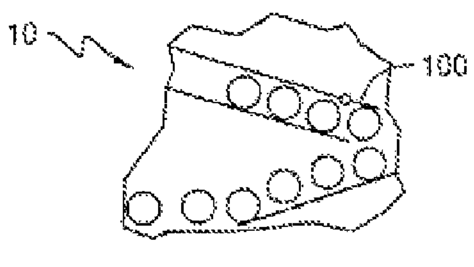
Figure 5H:
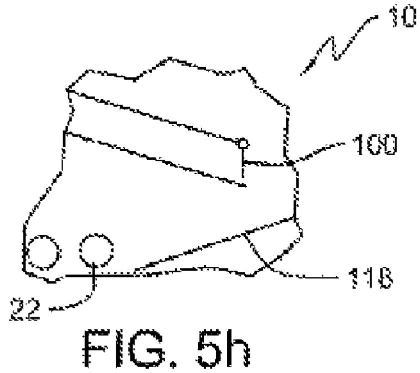

Referring to FIG. 4, dispenser 10 is preferably initially stocked from the middle shelf inlet 26. This is accomplished by a stockperson first pivoting bottle loading mechanism 72 to the bottle loading position with face plate 78 tilted away from the inlet ends of middle shelf sidewalls 56, 58 and housing 20. When loading mechanism 72 is in the open or loading position extending outwardly from housing 20, trough 86 is readily accessible to the stockperson. Once bottle 22 is placed in trough 86, trough 86 is pivoted to the container unloading or releasing position shown for middle shelf 14 in FIG. 4. In the bottle unloading position, rear plate 80 of mechanism 72 contacts middle ramp 64, and rear plate 80 is inclined to allow bottle 22 to roll off rear plate 84 onto middle ramp 64.

It is very important that the containers do not become misaligned as they enter dispenser 10 or as they roll along shelf ramps 44, 64 and 118. If a bottle becomes skewed at too much of an angle, the bottle will jam within dispenser 10. Such jamming may occur shortly after a stocked bottle enters dispenser 10 if, in stocking of bottle, the axis of the bottle is not carefully aligned perpendicular to the intended line travel of bottle 22, i.e. the line along the axis of ramp 64. If a jamming occurs, a stockperson can manually correct the jamming problem by removal or realignment of the jammed bottle so that dispenser may be restored to operability.

Loading mechanism 72 is specifically designed to significantly reduce the likelihood of bottle jamming from occurring, even during a relatively rapid stocking of bottles 22 into dispenser 10. In this regard, it is pointed out that loading mechanism 72 is positioned on dispenser 10, so that the axis of loading mechanism 72 and trough 86 is perpendicular to the intended travel of bottles 22 along ramp 64. Thus, once bottle 22 is placed within trough 86, the cooperation between inner surface 82 of front plate 78 and the inner surface 84 of rear plate 80 act to automatically initially align bottle 22 with respect to the intended bottle travel direction. The alignment is maintained in trough 86 during pivoting of loading mechanism 72 from the bottle loading position to the bottle unloading position. In an embodiment where trough 86 includes fins 92, the top surfaces 94 of fins 92 cooperate with rear plate 80 to hold and align bottle 22.

Since bottle 22 is automatically aligned by trough 86, quick and reliable stocking is accomplished without the stockperson needing to pause to manually align bottle 22 relative to ramp 64. Not only does this speed stocking, but it also makes stocking less physically tasking. This is because the stockperson does not need to support the relatively heavy 2 liter bottle 22 for as long a period of time compared to when manually aligning bottle 22. Dispenser 10 provides a particular advantage in reducing physical stress during stocking for applications when the dispenser 10 is placed on a higher shelf and the stockperson must reach upward to stock bottles 22. It can also be appreciated that when loading mechanism 72 is pivoted outwardly to the loading position spaced away from housing 20, the open access to trough 86 makes the stocking quicker and easier.

Loading mechanism 72 also provides an advantage in the maintaining of the alignment of bottle 22 as loading mechanism 72 is pivoted to the unloading position. This is because inner surface 82 of front plate 78, or surfaces 98 if ribs 92 appear on surface 82, contacts bottle 22 to relatively evenly distribute the forces along bottle 22 as the stockperson pushes upon the outer surface 142 of loading mechanism front plate 78 to pivot mechanism 72 from the loading to the unloading position. Thus, the stockperson can rely on front plate 78 to relatively evenly distribute the force along bottle 22 and to evenly distribute the force in the direction of the intended pathway down ramp 64. Therefore the stockperson need not attempt to position his or her hand centrally on bottle 22, while also attempting to direct the pushing motion in a direction closely aligned along the path of intended bottle travel so as to inhibit the skewing of bottle 22 as it enters or travels along ramp 64. Hence stocking can be accomplished more quickly and with less exertion for the stockperson.

Each of ramps 44, 64, and 118 may also be equipped with a pair of guide ribs 144. Guide rails 144 are positioned parallel to each other and extend along the intended path of bottles 22. For bottles designed with a concave central portion 146, guide rails 144 cooperate with the first end 148 and the second end 150 of concave surface 146 of bottle 22 to act to prevent skewing of bottle 22 as it travels along inclined ramps 44, 64, and 118.

Referring also to FIGS. 5*a*-5*d* showing the progression of stocking bottles 22, and FIGS. 5*e*-5*h* showing the progression of dispensing bottles 22 from dispenser 10, as the first bottle 22 is stocked it rolls downward and rearward along middle ramp 64 to reach normally downwardly depending flap door or gate 100. As bottle 22 hits gate 100, gate 100 swings upward to allow bottle 22 to pass through, while at the same time acting to slow the speed of passing bottle 22. Bottle 22 continues to move rearward to contact bumper pad 70 cushioning the impact against back wall 60 and further reducing the speed of bottle 22. At that point, bottle 22 falls through opening 68 towards lower inclined ramp 118 whereupon it rolls forward and downward along ramp 118 coming to rest within cradle 34. It is noted that as bottle 22 falls towards lower ramp 118, bottle 22 contacts shock absorption ramp 136. Shock absorption ramp 136 flexes to further absorb energy from falling bottle 22 and slow its speed. It is also noted that as bottle 22 impacts rear end 126 of bottom ramp 118, bumper 128 also absorbs energy from bottle 22.

The second bottle to be stocked duplicates the path of the initial bottle and comes to rest adjacent the bottle that continues to rest within cradle 34. In a like manner, bottles 22 are sequentially stocked to fill up bottom ramp 118, the lower section of rear channel 134 and middle ramp 64. Thereafter, top ramp 44 is stocked by means of loading mechanism 74 at top inlet 30. It is noted that once the bottom ramp 118 and the lower section of rear channel 134 have been stocked, flap door 100 remains in the upward position. Thus, the first bottle stocked within top shelf 16 comes to rest upon gate 100 as it is held in a generally horizontal position.

When initial bottle 22 is removed by a shopper from cradle 34 of a fully stocked dispenser, the bottle resting on top of gate 100 forces gate 100 downward as that bottle falls downward within back channel 134. Thereafter, gate 100 temporarily prohibits entrance of the upstream bottles stocked on middle ramp 64. Once a sufficient number of bottles are removed from dispenser 10 to deplete the supply of bottles on top ramp 44, the force of the remaining bottles on middle ramp 64 located upstream of gate 100, cause gate 100 to return to the upward position. Thereafter, bottles 22 are sequentially advanced on ramp 64 as bottles are removed from cradle 34. Thus, it can be appreciated that gate 100 acts not only to slow bottles stocked within middle ramp 64, but also acts to regulate the traffic of bottles on top ramp 44 and middle ramp 64 as they enter rear channel 134. It is also noted that it is preferable, although not required, to first load bottles from the middle inlet 26 so as to minimize the distance a bottle drops down rear channel 134 during stocking, and hence minimize the shock to bottle 22.

It is also noted that dispenser 10 can accommodate an upward expansion by adding an additional shelf, or shelves, if desired, to increase the bottle capacity of dispenser 10 and hence increase store shelf capacity. Dispenser 10 can also be expanded horizontally. Also, while dispenser 10 is particularly useful in dispensing bottles from an upper shelf, it may be advantageously employed on lower shelves as well.

Figure 6:
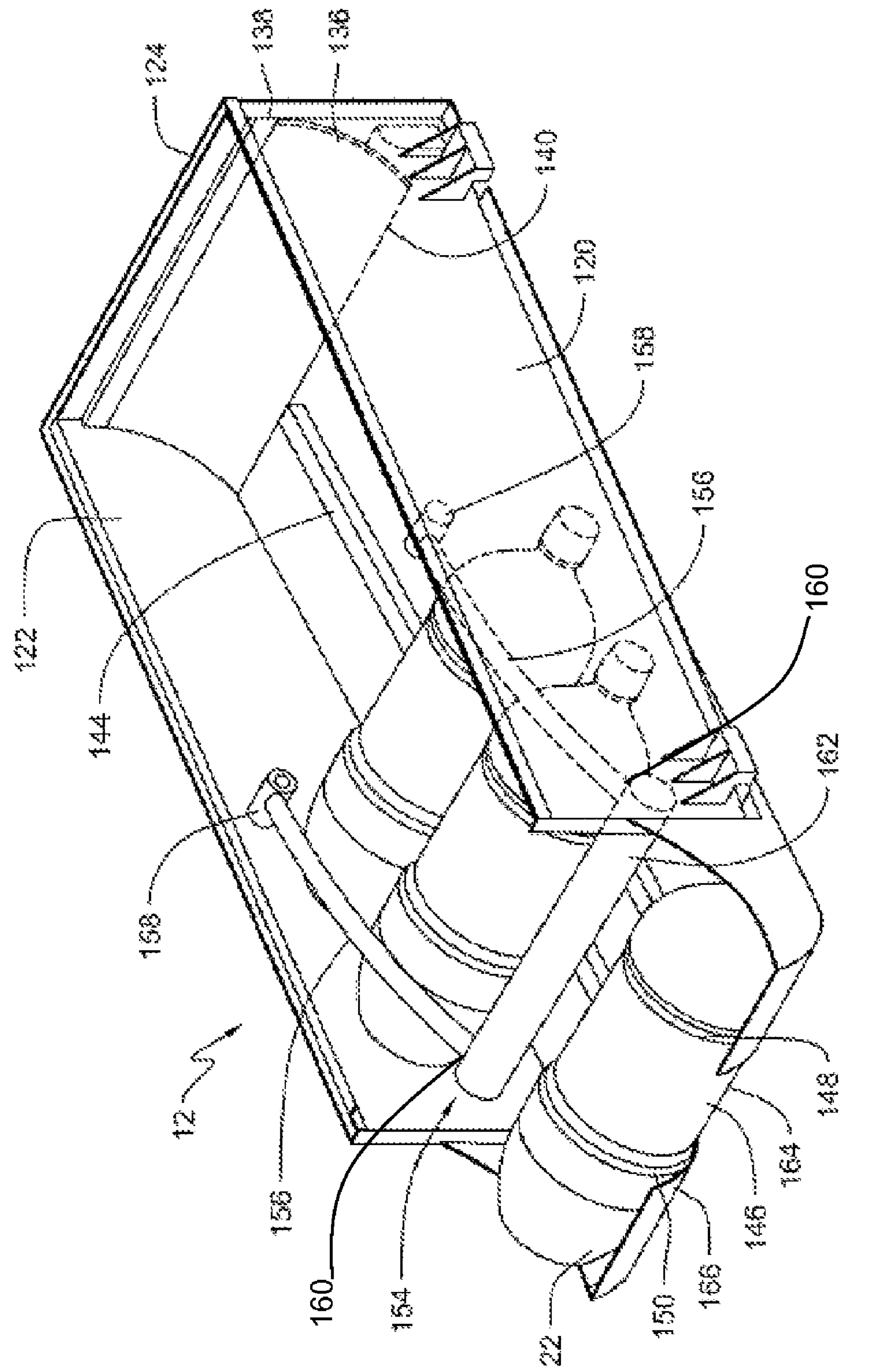
FIG. 6 is a perspective view showing the dispenser with a bottle stopper mechanism.

A second embodiment for dispenser 10 is shown in FIG. 6 and provides an on-demand release bottle stopper mechanism 154 for stopping a bottle 22 on bottom ramp 118 prior to rolling out outlet 32 to cradle 34. Stopper mechanism 154 includes arm members 156, each with a rear end 158 that is mounted on lower shelf sidewalls 120 and 122. Arms 156 also have free, or cantilever, ends 160 preferably with a rod 162 attached to ends 160. Stopper mechanism 154 is mounted with free ends 160, and its attached rod 162, positioned in the pathway of bottles moving along bottom inclined ramp 118, so as to contact the upper half of bottle 22 to stop its forward progress.

For a shopper to dispense a bottle 22, the shopper pushes or pulls handle rod 162 upward so that rod 162 is raised above the bottle 22 to thereby allow bottle 22 to roll downward into cradle 34. When a bottle is in cradle 34, the next bottle in line abuts the bottle in cradle 34 and is stopped on ramp 118. When handle rod 162 of stopper mechanism 154 is released to return to its downward position, rod 162 contacts the front of bottle 22 to restrain bottle 22 from continued forward movement. Bottle 22 can then easily be removed from the cradle since that bottle is isolated from the pressure of the weight of upstream bottles by stopper mechanism 154. Arms 156 may be formed of a flexible material to allow arms 156 to be manually moved, or flexed, from the bottle stopping position to the bottle releasing position, with arms 156 returning to the bottle stopping position when rod 162 is released. Arms 156 may also be of a rigid material with a spring (not shown) normally biasing arms 156 to the bottle stopping position with a manually applied force moving arms 156 upward to release a bottle.

U-shaped opening 164 in cradle edge 166 provides a convenient access by a shopper for gripping bottle 22. It is also noted that for the embodiment utilizing stopper mechanism 154, an empty cradle 34 results after a shopper shops the bottle from cradled 34. Thus, the shopper changes his or her mind about purchasing the bottle, the shopper can put the bottle back into the empty cradle, since stopper mechanism 154 has prevented the next in-line bottle from advancing to the empty cradle 34.

Figure 7C:
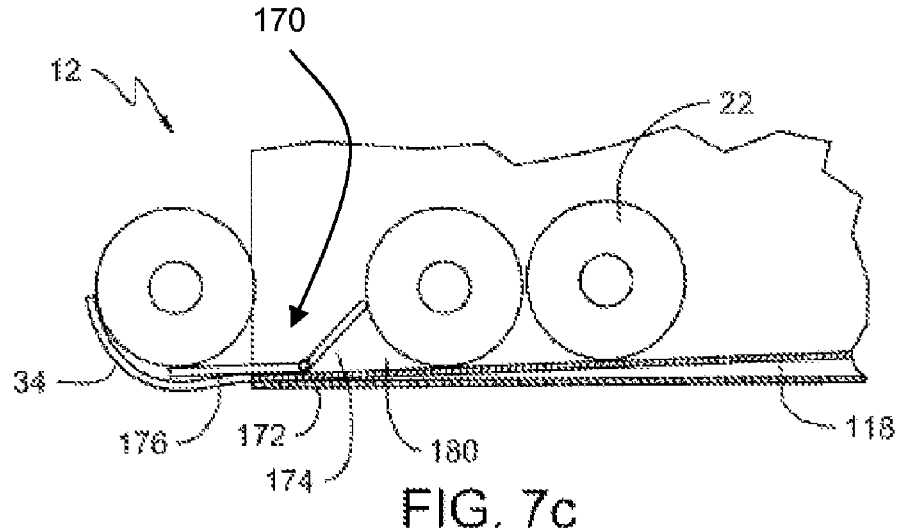
FIGS. 7*a*-7*c* are schematic drawings showing the operation of the dispenser with an alternative bottle stopper mechanism.
Figure 7B:
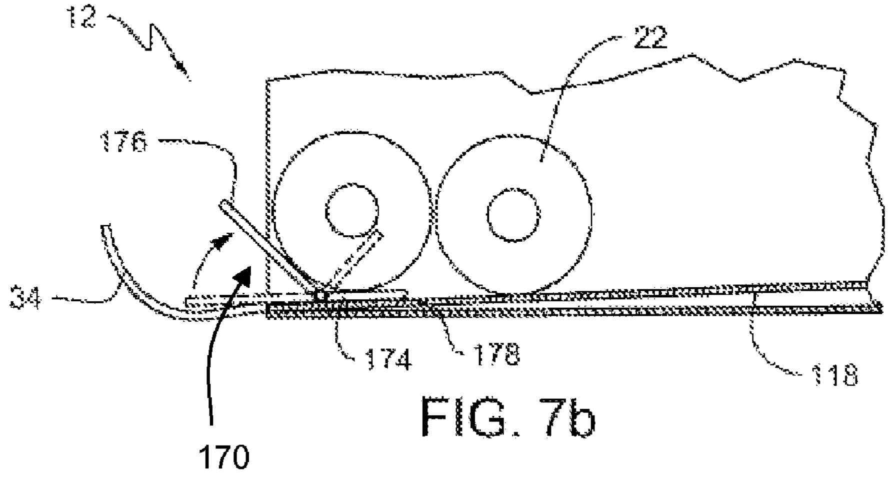
Figure 7A:
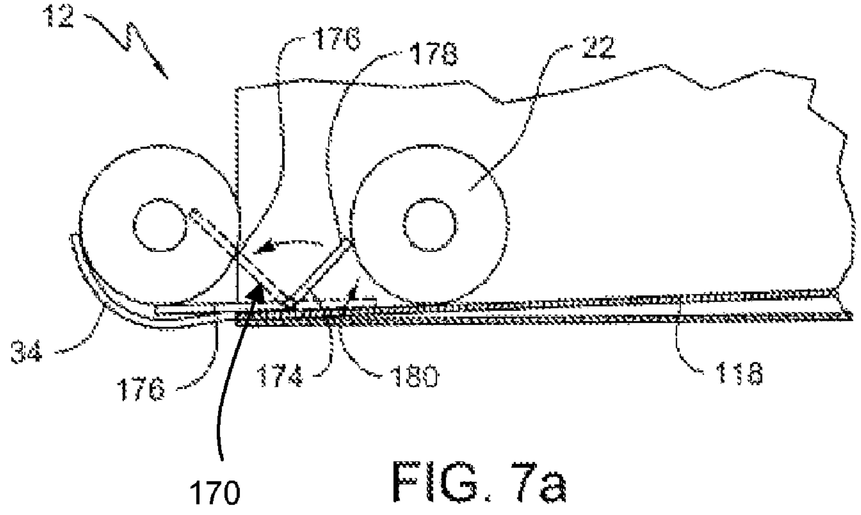

A third embodiment is shown in FIGS. 7*a*-7*c* with an alternative rocking stopper mechanism 170 pivotably mounted on rod 172 adjacent outlet 32, such as by mounting on sidewalls 120, 122. Rocking stopper mechanism 170 has a rear plate 174 and a front plate 176. A spring (not shown) normally biases rocking stopper mechanism 170 to a position with rear plate 174 pivoted downward to allow a bottle 22 to roll over rear plate 174, and thereafter onto front plate 176. The biasing force of the spring is set at a level such that the weight of bottle 22 rolling onto forward plate 176 allows forward plate 176 to pivot downward. In the downward position, such as shown in FIGS. 7*a* and 7*b*, a bottle has rolled into cradle 34 for dispensing, while at the same time such bottle causes rear plate 174 to pivot upward so that edge 178 of rear plate 176 contacts the next bottle in line and stops the forward progress of such next bottle in line. When the bottle is removed from the cradle 34, stopper mechanism 170 pivots back to the position shown in FIG. 7*b* allowing a bottle to roll onto rear plate 174 and then onto front plate 176. The weight of the bottle on front plate 176 rotates front plate 176 downward allowing the bottle to roll into cradle 34. With front plate 176 down, attached rear plate 174 is pivoted upward to stop the next in line container 22. It is noted that edge 178 of rear plate 174 contacts container 22 in the lower half 180 of bottle 22, so that when a bottle 22 is removed from cradle 34, rear plate 174 is readily allowed to be urged downward toward ramp 118 by the biasing force of the spring, without interference by bottle 22 acting on edge 178. Preferably, edge 178 contacts container 22 at a height from ramp 118 that is approximately'/4 of the diameter of the bottle. The 'teeter-totter' like action of the rocking stopper mechanism 170 may be continued to allow sequential dispensing of bottles 22 from dispenser 10.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A dispenser for storing and sequentially dispensing a plurality of containers, said dispenser comprising;

a plurality of shelves, including at least a top shelf, a middle shelf, and a bottom shelf, the bottom shelf comprising a back wall, two sidewalls, and an inclined ramp extending downwardly toward a dispensing outlet at a front portion of the bottom shelf;

the top shelf comprising a back wall, two sidewalls, and an inclined ramp extending downwardly toward the back wall;

the middle shelf comprising a back wall, two sidewalls, and an inclined ramp extending downwardly toward the back wall;

a door attached to the top shelf, the door including sidewalls defining tracks for guiding movement of the door, the door being movable between and open and closed position, wherein the door swings outwardly and upwardly to the open position and is configured to rest upon the sidewalls of the top shelf when the door is in the open position; and one or more passageways providing a pathway for the containers to roll from one or more of the plurality of shelves to the bottom shelf, wherein the containers are prevented from being loaded onto the plurality of shelves when the door is in the closed position and the containers are allowed to be loaded when the door is in the open position.

2. The dispenser of claim 1, wherein the middle shelf further comprises a bumper mounted to the back wall of the middle shelf.

3. The dispenser of claim 1, wherein the plurality of shelves, including the top shelf, bottom shelf, and middle shelf, are stackable on top of each other.

4. The dispenser of claim 1, wherein the middle shelf includes a container loading mechanism adjacent a front portion of the middle shelf.

5. The dispenser of claim 1, wherein the top shelf includes a container loading mechanism adjacent a front portion of the top shelf.

* * * * *